(12) United States Patent
Koeppel et al.

(10) Patent No.: US 11,023,936 B2
(45) Date of Patent: Jun. 1, 2021

(54) SYSTEMS AND METHODS FOR PURCHASE DEVICE

(71) Applicant: Capital One Services, LLC, McLean, VA (US)

(72) Inventors: Adam Koeppel, Washington, DC (US); Robert Perry, Ashburn, VA (US)

(73) Assignee: Capital One Services, LLC, McLean, VA (US)

( * ) Notice: Subject to any disclaimer, the term of this patent is extended or adjusted under 35 U.S.C. 154(b) by 113 days.

(21) Appl. No.: 16/394,740

(22) Filed: Apr. 25, 2019

(65) Prior Publication Data

US 2020/0058056 A1 Feb. 20, 2020

Related U.S. Application Data

(63) Continuation of application No. 16/103,367, filed on Aug. 14, 2018, now Pat. No. 10,319,008.

(51) Int. Cl.

| *G06Q 30/06* | (2012.01) |
|---|---|
| *H04W 4/021* | (2018.01) |
| *G06Q 20/32* | (2012.01) |
| *G06Q 30/00* | (2012.01) |
| *G06Q 20/12* | (2012.01) |
| *G06Q 20/20* | (2012.01) |
| *G06Q 20/38* | (2012.01) |
| *G06Q 20/40* | (2012.01) |

(52) U.S. Cl.
CPC ............ *G06Q 30/06* (2013.01); *G06Q 20/12* (2013.01); *G06Q 20/20* (2013.01); *G06Q 20/327* (2013.01); *G06Q 20/389* (2013.01); *G06Q 20/405* (2013.01); *G06Q 30/01* (2013.01); *H04W 4/021* (2013.01)

(58) Field of Classification Search
CPC ...... G06Q 30/06; G06Q 30/01; G06Q 20/327; G06Q 20/12; G06Q 20/20; G06Q 20/389; G06Q 20/405; H04W 4/021
USPC ........................................................ 705/26.1
See application file for complete search history.

(56) References Cited

U.S. PATENT DOCUMENTS

| 9,269,103 | B1 * | 2/2016 | Kumar | ............... G06Q 10/0835 |
|---|---|---|---|---|
| 10,078,861 | B1 * | 9/2018 | Clare | ................. G06Q 30/0635 |
| 2007/0265935 | A1 * | 11/2007 | Woycik | .................... G07G 1/14 705/65 |
| 2008/0222004 | A1 | 9/2008 | Pollock et al. | |
| 2008/0257957 | A1 * | 10/2008 | Steinecker | ........... G06Q 20/367 235/380 |

(Continued)

FOREIGN PATENT DOCUMENTS

GB 2521244 A 6/2015

*Primary Examiner* — Yogesh C Garg
(74) *Attorney, Agent, or Firm* — Finnegan, Henderson, Farabow, Garrett & Dunner LLP (57) ABSTRACT

Systems and methods for in-store purchases are provided. An exemplary method may include receiving by a customer device associated with a customer, customer data including customer preference data. The method may include storing the received customer data and identifying a merchant at a location of the customer. The method may also include determining a customer order for the identified merchant based on the customer preference data. Further, the method may include transmitting a notification to a merchant device associated with the identified merchant, the notification including the determined customer order.

20 Claims, 5 Drawing Sheets

(56) References Cited

U.S. PATENT DOCUMENTS

| | | |
|---|---|---|
| 2011/0246370 A1 | 10/2011 | Wang et al. |
| 2012/0059741 A1 | 3/2012 | Khan et al. |
| 2013/0317921 A1 | 11/2013 | Havas |
| 2014/0019377 A1 | 1/2014 | Bhaumik et al. |
| 2015/0186886 A1 | 7/2015 | Schwalb et al. |
| 2016/0086236 A1* | 3/2016 | Viner ................ G06K 9/00295 705/26.1 |
| 2018/0121993 A1 | 5/2018 | Agarwal et al. |

* cited by examiner

SYSTEMS AND METHODS FOR PURCHASE DEVICE

RELATED APPLICATION

This application is a continuation of U.S. patent application Ser. No. 16/103,367, filed Aug. 14, 2018, now allowed, the contents of which are expressly incorporated herein by reference in their entirety.

TECHNICAL FIELD

The disclosed embodiments generally relate to systems and methods for improving fast in-store purchases using a dedicated device.

BACKGROUND

In larger cities and crowded urban areas, some retail customers of goods and/or services want increased efficiency regarding placing orders in brick and mortar stores. Additionally, some retail customers may be longing for a small town feel, and desired that local retail stores knew them and their order personally. For these customers a need for increased efficiency surrounding placing orders and generating the 'small town' feel is needed.

SUMMARY

The disclosed embodiments describe systems and methods for completing quick in-store purchases.

In one embodiment, a system for providing in-store purchases includes a customer device including: a memory device storing software instructions, and one or more processors configured to execute the software instructions to: receive customer data of a customer associated with the customer device, the customer data including customer preference data, store the received customer data, identify a merchant at a location of the customer, determine a customer order for the identified merchant based on the customer preference data, and transmit a notification to a merchant device associated with the identified merchant, the notification including the determined customer order.

In another embodiment, a method for providing in-store purchases includes receiving by a customer device associated with a customer, customer data associated with the customer, the customer data including customer preference data, storing the received customer data, identifying a merchant at a location of the customer, determining a customer order for the identified merchant based on the customer preference data, and transmitting a notification to a merchant device associated with the identified merchant, the notification including the determined customer order.

In another embodiment, a non-transitory computer-readable storage medium storing instructions that are executable by at least one process to provide in-store purchases. The instructions, when executed by a processor, cause the computer to perform the steps of receiving by a customer device associated with a customer, customer data associated with the customer, the customer data including customer preference data, storing the received customer data, identifying a merchant at a location of the customer, determining a customer order for the identified merchant based on the customer preference data, and transmitting a notification to a merchant device associated with the identified merchant, the notification including the determined customer order.

It is to be understood that both the foregoing general description and the following detailed description are exemplary and explanatory only and are not restrictive of the disclosed embodiments, as claimed.

BRIEF DESCRIPTION OF THE DRAWING

The accompanying drawings, which are incorporated in and constitute a part of this specification, illustrate disclosed embodiments and, together with the description, serve to explain the disclosed embodiments. The drawings are not exhaustive. Instead, emphasis is generally placed upon illustrating the principles of the disclosed embodiments described herein. In the drawings.

DETAILED DESCRIPTION

Reference will now be made in detail to the disclosed embodiments, examples of which are illustrated in the accompanying figures. The disclosed systems and methods relate to using micro accelerations as a biometric identification factor for authentication using an electronic transaction card or other device.

Disclosed embodiments include customer devices, such as key fobs, and systems and methods that facilitate performing quick in-store purchases. As used herein, a "quick" purchase may refer to a predetermined transaction that is made with minimal effort on the part of the customer.

Figure 1:
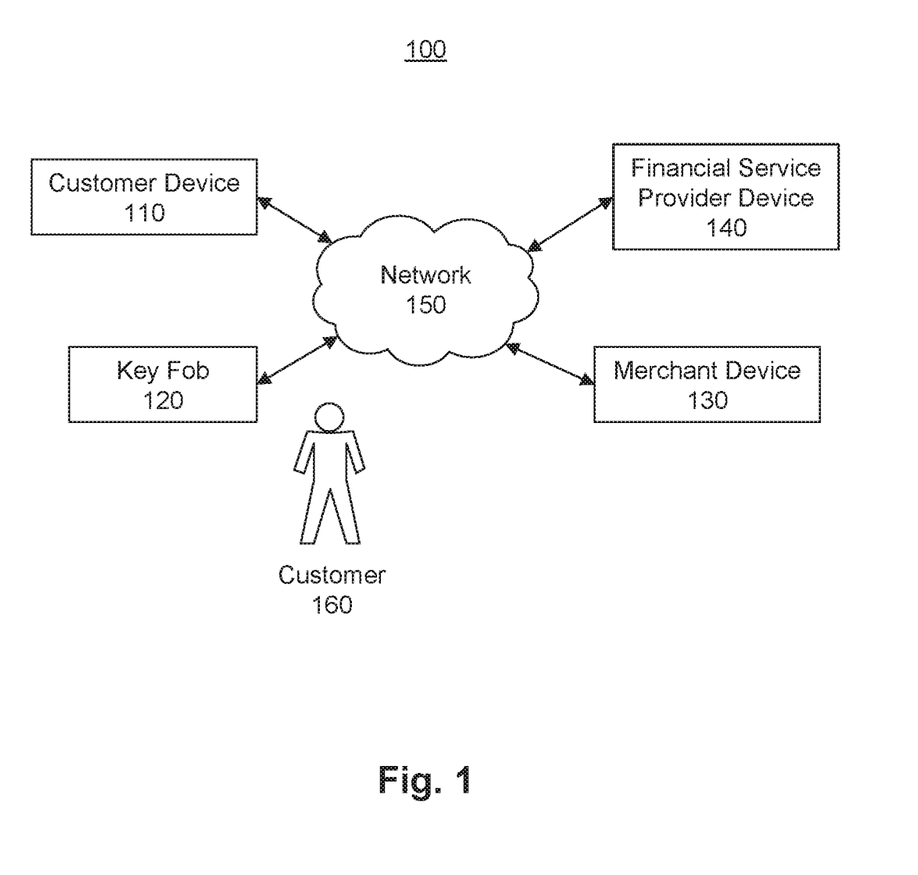
FIG. 1 is a block diagram of an exemplary system, consistent with the disclosed embodiments.

FIG. 1 is a block diagram illustrating an exemplary system 100, consistent with disclosed embodiments that may be configured for performing quick in-store purchases consistent with disclosed embodiments. As shown, system 100 includes a customer device 110, another customer device provided as a key fob 120, a merchant device 130, and a financial service provider device 140, all of which are communicatively coupled by a network 150. While only one customer device 110, key fob 120, merchant device 130, and financial service provider device 140 are shown, it will be understood that system 100 may include more than one customer device 110, key fob 120, merchant device 130, and/or financial service provider device 140. The components and arrangement of the components included in system 100 may vary.

Each of devices 110-140 may be a computing system configured to provide, use, and/or process customer data and location data. As further described herein, devices 110-140 may include one or more computing devices (e.g., computer(s), server(s), embedded systems), memory storing data and/or software instructions (e.g., database(s), memory devices. In some embodiments, the one or more computing devices are configured to execute software instructions stored on one or more memory devices to perform one or more operations consistent with the disclosed embodiments. Each of devices 110-140 may be configured to communicate with one or more of devices 110-140. In certain aspects, customers may operate one or more of devices 110-140 to initiate one or more operations consistent with the disclosed embodiments. For example, customer device 110 may be operated by a customer 160. Customer 160 may be an owner/operator of customer device 110 and/or key fob 120, and may be a customer of one or more entities associated with devices 130 and/or 140. In some aspects, customer 160 may be an entity, rather than an individual(s), associated with the respective device 130 or 140.

Customer device 110 may be one or more computing devices configured to execute software instructions for performing one or more operations consistent with the disclosed embodiments. In one embodiment, customer device 110 may be a mobile device (e.g. tablet, smartphone, etc.), a desktop computer, a laptop, a server, a wearable device (eyeglasses, a watch, etc.), and/or device dedicated hardware device. Customer device 110 may include one or more processors configured to execute software instructions stored in memory, such as memory included in customer device 110. Customer device 110 may include software that, when executed by a processor, performs known Internet-related communication and content display processes. For instance, customer device 110 may execute browser software that generates and displays interface screens including content on a display device included in, or connected to, customer device 110. The disclosed embodiments are not limited to any particular configuration of customer device 110. For instance, customer device 110 may be a mobile device that stores and executes mobile applications that provide financial-service-related functions offered by a financial service provider, such as an application associated with one or more financial accounts that a customer (e.g., customer 160) holds with a financial service provider. Customer 160 may enter and store customer preferences pertaining to applicable in-store purchases on customer device 110, which may be transferred to key fob 120, consistent with the present disclosure. For example, customer 160 may select categories of merchants or a specific merchant associated with the in-store purchase and choose applicable orders to place with the respective merchants.

In one embodiment, customer 160 uses customer device 110 and key fob 120 to perform one or more operations consistent with the disclosed embodiments. In one aspect, customer 160 may be a customer or potential customer of a merchant associated with merchant device 130. For instance, customer 160 may transact business with the merchant associated with merchant device 130. In another aspect, customer 160 may be a customer of a financial service provider associated with financial service provider device 140. For instance, the financial service provider may maintain a financial service account (e.g., checking account, credit account, or the like) for customer 160.

In various embodiments, key fob 120 is associated with customer 160. In some embodiments, key fob 120 may include a data storage component disposed in the key fob. As used herein, a "data storage component" may be or include one or more devices configured to receive, store, process, provide, transfer, send, delete, and/or generate data or other information. For example, the data storage component may include a microchip (e.g., EMV chip), a communication component or device (e.g., Near Field Communication (NFC) antenna, radiofrequency identification (RFID) device, Bluetooth® device, Wi-Fi device), a magnetic strip, a barcode, a Quick Response (QR) code, and/or other devices. The data storage component may be configured to store information in a computer-readable format. For example, the data storage component may be configured to store information in a format that can be read by customer device 110, merchant device 130, transmitted over network 150, and read or processed by financial service provider device 140. Key fob 120 may be any computing device. In some embodiments, key fob 120 may be a remote control device, designed for keychain usage, that allows a customer to instantly (e.g., as soon as key fob 120 communicates with merchant device 130 or upon the press of one or more buttons) order and pay for an item when entering a store thereby facilitating a quick purchase. In some aspects, key fob 120 may include one or more buttons that customer 160 may press, each of the one or more buttons may be assigned to execute software instructions, consistent with the present disclosure. For example, customer 160 may press a first button to place a first order with a first merchant. Customer 160 may press a second button to place a second order with a first or second merchant, etc. Key fob 120 may have multiple buttons, that customer 160 may press, allowing customer 160 to place multiple orders. For example, customer 160 may be present in a retail shop (e.g., a coffee shop) and upon pressing one of the buttons, key fob 120 places an order associated with the button press.

In certain embodiments, key fob 120 may function as a repeater, receiving the first and second, etc., orders and/or a purchase token from customer device 110 and sending the first and second etc., orders and/or a purchase token to merchant device 130 and/or financial service provider device 140.

In certain embodiments, key fob 120 may comprise one or more buttons that customer 160 may press, which transmits instructions to customer device 110 to generate instructions for placing an order and/or a purchase token.

In certain embodiments, key fob 120 may comprise one or more buttons that customer 160 may press, which transmits instructions to customer device 110 to generate an order and/or purchase token, which is then transmitted back to the key fob 120, wherein the key fob 120 functions as a repeater to transmit the order and/or purchase token to merchant device 130 and/or financial service provider device 140.

Merchant device 130 may include one or more computer systems associated with a merchant. For example, merchant device 130 may be associated with an entity that provides goods and/or services, e.g., a retail store. The merchant may include brick-and-mortar location(s) that a customer e.g., customer 160, may physically visit to purchase goods and services using a key fob, e.g., key fob 120. Such physical locations may include computing devices (e.g., merchant device 130) that perform financial service transactions with customers (e.g., POS terminal(s), kiosks, etc.). In various embodiments, merchant device 130 may be configured to perform financial transaction processes, such as receiving, processing, and handling purchase transactions, payment processes, etc., associated with the sale of goods and/or services provided by the associated merchant. In some aspects, merchant device 130 may include computing devices that include back and/or front-end computing components that store consumer transaction data and execute software instructions to perform operations consistent with the disclosed embodiments, such as computers that are operated by employees of the associated merchant (e.g., back-office systems).

Financial service provider device 140 may be associated with a financial service provider. The financial service provider may be a bank, credit union, credit card issuer, or other type of financial service entity that generates, provides, manages, and/or maintains financial service accounts for one or more customers (e.g., customer 160). Financial service accounts may include, for example, checking accounts, and any other types of financial service accounts known to those skilled in the art. Financial service accounts may be associated with electronic accounts, such as a digital wallet or similar account that may be used to perform electronic transactions, such as purchasing goods and/or services online or in stores. Financial service accounts may also be associated with physical financial service account cards, such as a debit or credit card that customer 160 may carry on their person and use to perform financial service transactions, such as purchasing goods and/or services at a point of sale terminal (e.g., merchant device 130).

The financial service provider includes infrastructure and components that are configured to generate and provide financial service accounts and financial service account cards (e.g., debit cards, credit cards). The financial service provider may also include infrastructure and components that are configured to manage transactions associated with a customer service account. In certain aspects, financial service provider device 140 may include one or more computing devices configured to communicate with customer device 110, key fob 120, and merchant device 130 via network 150 to execute processing steps associated with facilitating in-store purchases by customer 160.

In certain aspects, the financial service provider associated with financial service provider device 140 may provide a primary financial service to a customer, e.g., customer 160. For example, the financial service provider may maintain a credit card account with customer 160, in a manner known in the art. In addition to the primary service (e.g., credit card account), the financial service provider may also provide additional services to customer 160 to provide fast in-store purchases. These additional services may include, for example, receiving a transmitted notification from key fob 120, for example through network 150, to complete a transaction, for example with merchant device 130. For example, a credit line may be associated with the key fob 120, such that key fob 120 may allow customer 160 to complete purchases (e.g., key fob 120 sends instructions to financial service provider device 140 to complete a pending transaction with merchant device 130).

Network 150 may be any type of network configured to provide communications between components of system 100. For example, network 150 may be any type of network (including infrastructure) that provides communications, exchanges information, and/or facilitates the exchange of information, such as the Internet, a Local Area Network, near field communication (NFC), Bluetooth®, Wi-Fi, or other suitable connection(s) that enables the sending and receiving of information between the components of system 100. In other embodiments, one or more components of system 100 may communicate directly through a dedicated communication link(s) (not shown), such as a link between customer device 110 and key fob 120.

In some embodiments, customer 160 associated with customer device 110 and/or key fob 120 may purchases goods and/or services from the merchant associated with merchant device 130. In some instances, customer 160 may use a financial account provided by a financial service provider, such as the financial service provided associated with financial service provider device 140, to pay for the purchased goods and/or services. In other instances, customer 160 may use another payment method, such as cash, while using key fob 120 to place the order for goods and/or services.

Figure 2:
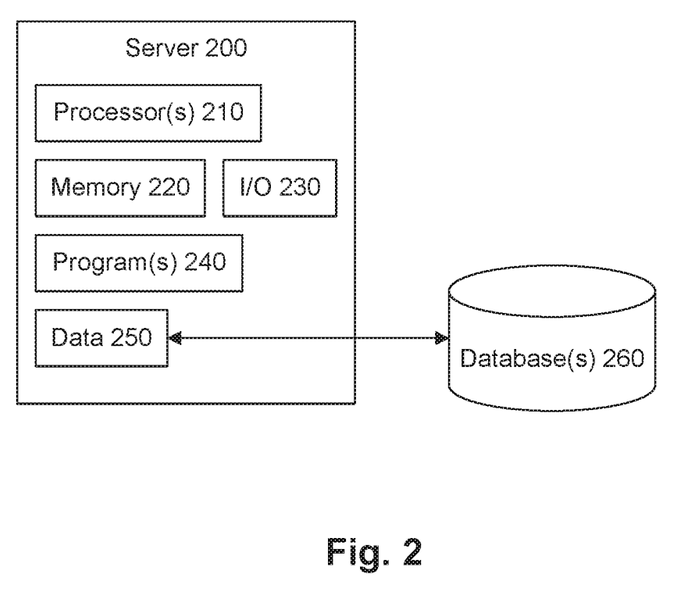
FIG. 2 is a block diagram of an exemplary server, consistent with the disclosed embodiments.

FIG. 2 is an exemplary block diagram of a server 200 for implementing embodiments consistent with the present disclosure. Variations of server 200 may be implemented to serve as merchant device 130 or financial service provider device 140.

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations of those described herein) will be apparent to persons skilled in the relevant art(s) based on the teachings contained herein. For example, merchant device 130 may include financial service provider device 140 for performing operations associated with a private label financial account provided by a merchant associated with merchant device 130 and/or key fob 120. Such alternatives fall within the scope and spirit of the disclosed embodiments.

Variations of server 200 may be used by merchant device 130, and/or financial service provider device 140.

In one embodiment, server 200 includes one or more processors 210, one or more memories 220, and one or more input/output (I/O) devices 230. According to some embodiments, server 200 may be an embedded system or similar computing device that generates, maintains, and provides web site(s) consistent with disclosed embodiments. Server 200 may be standalone, or it may be part of a subsystem, which may be part of a larger system. For example, server 200 may represent distributed servers that are remotely located and communicate over a network (e.g., network 150) or a dedicated network, such as a LAN. Server 200 may correspond to any of merchant device 130 and financial service provider device 140.

Processor 210 may include one or more known processing devices, such as a microprocessor from the Core™, Pentium™ or Xeon™ family manufactured by Intel™, the Turion™ family manufactured by AMD™, or the "Ax" or "Sx" family manufactured by Apple™, for example. The disclosed embodiments are not limited to any type of processor(s) otherwise configured to meet the computing demands required of different components of server 200.

Memory 220 may include one or more storage devices configured to store instructions used by processor 210 to perform functions related to disclosed embodiments. For example, memory 220 may be configured with one or more software instructions, such as program(s) 240 that may perform one or more operations when executed by processor 210. The disclosed embodiments are not limited to separate programs or computers configured to perform dedicated tasks. For example, memory 220 may include a single program 240 that embodies the functions of server 200, or program 240 could comprise multiple programs. Additionally, processor 210 may execute one or more programs located remotely from server 200. For example, customer device 110, key fob 120, merchant device 130, and/or financial device 140, may, via server 200, access one or more remote programs that, when executed, perform functions related to certain disclosed embodiments. Memory 220 may also store data 250 that reflects any type of information in any format that server 200 may use in system 100 to perform operations consistent with the disclosed embodiments.

I/O device 230 may be one or more devices configured to allow data to be received and/or transmitted by server 200. I/O devices 230 may include one or more digital and/or analog communication devices that allow server 200 to communicate with other machines and devices, such as other components of system 100.

Server 200 may also be communicatively connected to one or more database(s) 260. Server 200 may be communicatively connected to database(s) 260 through network 150. Database 260 may include one or more memory devices that store information and are accessed and/or managed through server 200. By way of example, database(s) 260 by include Oracle™ databases, Sybase™ database, or other relational databases or non-relational databases, such as Hadoop sequences files, HBase, or Cassandra. The databases or other files may include, for example, data and information related to the source and destination of a network request, the data contained in the request, etc. Systems and methods of the disclosed embodiments, however, are not limited to separate databases. In one aspect, system 200 may include database 260. Alternatively, database 260 may be located remotely from server 200. Database 260 may include computing components (e.g., database management system, database server, etc.) configured to receive and process requests for data stored in memory devices of database(s) 260 and to provide data from database 260.

Figure 3:
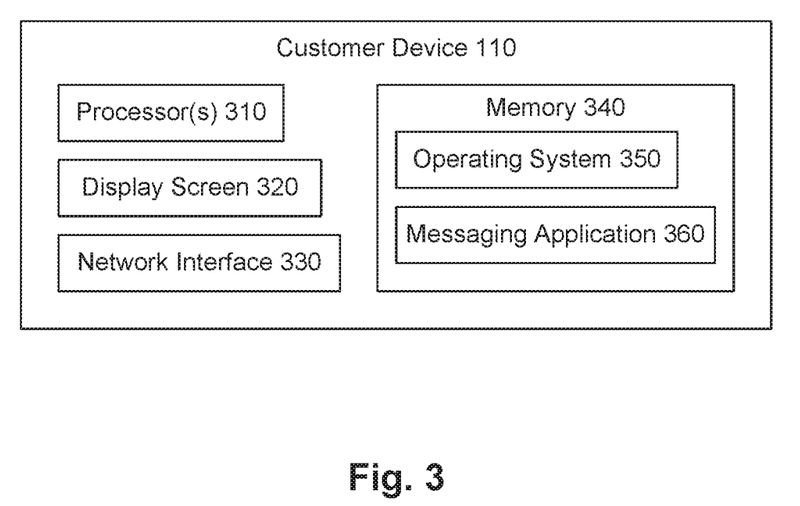
FIG. 3 is a block diagram of an exemplary customer device, consistent with the disclosed embodiments.

FIG. 3 is an exemplary block diagram of customer device 110 for implementing embodiments consistent with the present disclosure. Customer device 110 may be a mobile device with computing capabilities, such as a tablet, a smartphone, a wearable device, or any combination of these devices and/or affiliated components. As shown, customer device 110 includes one or more processors 310, a display screen 320, a network interface 330, and one or more memory devices 340 storing one or more operating systems 350, including an inbuilt messaging application 360.

Processor(s) 310 may include one or more known processing devices, such as a microprocessor from the Core™, Pentium™ or Xeon™ family manufactured by Intel™, the Turion™ family manufactured by AMD™, or the "Ax" or "Sx" family manufactured by Apple™ for example. The disclosed embodiments are not limited to any type of processor(s) otherwise configured to meet the computing demands required of different components of customer device 110.

Display screen 320 may include, for example, a liquid crystal display (LCD), a light emitting diode screen (LED), an organic light emitting diode screen (OLED), a touch screen, or other known display screens. Display screen 320 may display various kinds of information consistent with the disclosed embodiments.

Network interface 330 allows customer device 110 to send and receive information through network 150. Alternatively or additionally, network interface 330 may establish direct wired or wireless connection between customer device 110 and other system components, such as key fob 120, merchant device 130, and/or financial service provider device 140.

Memory 340 may be, for example, a magnetic, semiconductor, tape, optical, removable, non-removable, or other type of storage device or tangible (e.g., non-transitory) computer readable medium. Memory 340 may store operating system 350, as well as data and mobile applications for performing operations consistent with functions described below.

Operating system 350 may perform known operating system functions when executed by processor(s) 310. By way of example, operating system 350 may include Android™, Apple OS X™, Unix™, Linux™, or others. Accordingly, examples of the disclosed embodiments may operate and function with computer systems running any type of operating system having an inbuilt messaging application. Messaging application 360, when executed by processor 310, provides text messaging communication via network 150.

Figure 4:
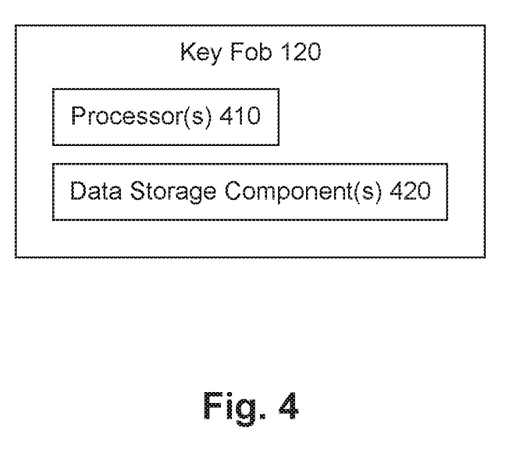
FIG. 4 is a block diagram of a key fob, consistent with the disclosed embodiments.

FIG. 4 is an exemplary block diagram of key fob 120. In some embodiments, key fob 120 may include one or more processors 410, and one or more data storage components. As used herein, a "data storage component" may be or include one or more devices configured to receive, store, process, provide, transfer, send, delete, and/or generate data or other information. For example, data storage component 420 may include a microchip (e.g., EMV chip), a communication component or device (e.g., Near Field Communication (NFC) antenna, radiofrequency identification (RFID) device, Bluetooth® device, Wi-Fi device), a magnetic strip, a barcode, a Quick Response (QR) code, Global Positioning Device, and/or other devices. Data storage component 420 may be configured to store information in a computer-readable format. For example, data storage device may be configured to store information in a format that can be read by merchant device 130, transmitted over network 150, and read or processed by financial service provider device 140 and/or customer device 110.

Processor(s) 410 may include one or more known processing devices, such as a microprocessor from the Core™, Pentium™ or Xeon™ family manufactured by Intel™, the Turion™ family manufactured by AMD™, or the "Ax" or "Sx" family manufactured by Apple™, for example.

In other embodiments, the components of key fob 120 may be incorporated into customer device 110, such that customer device 110 contains some or all of the components of key fob 120 and can perform the same functions, consistent with the disclosed embodiments. In other embodiments, the components of customer device 110 may be incorporated into key fob 120, such that key fob 120 contains some or all of the components of customer device 110 and can perform the same functions, consistent with the disclosed embodiments.

Figure 5:
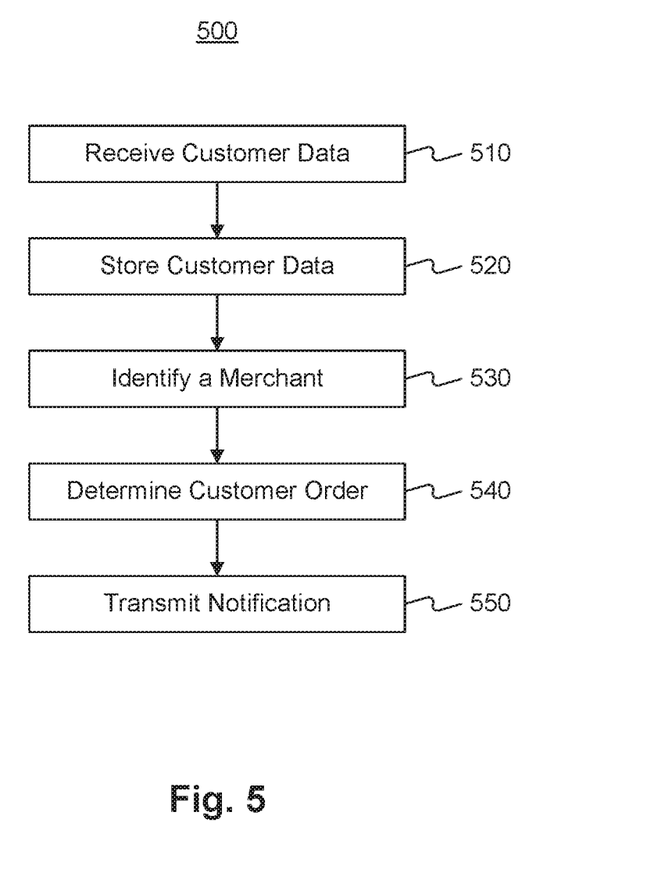
FIG. 5 is a flow chart of an exemplary process for providing fast in-store purchases, consistent with the disclosed embodiments.

FIG. 5 is a flow chart of an exemplary process 500 for providing quick in-store purchases consistent with embodiments of the present disclosure. In some aspects, key fob 120 may be carried by customer 160 and upon entering a store or merchant's premises, key fob 120 may communicate with merchant device 130 to place an order for goods and/or services. In some embodiments key fob 120 may communicate with merchant device 130 upon the pressing of one or more buttons on key fob 120 by customer 160. In some embodiments, key fob 120 may be carried by a person other than customer 160. In certain aspects, embodiments of the present disclosure speed up the process of ordering a recurring item, for example a specific coffee beverage. In other aspects, embodiments of the present disclosure build brand loyalty by affording customer 160 a personalized shopping and/or ordering experience. For example, customer 160 may walk into a store and customer 160's order is instantaneously placed (e.g., either by customer 160 pressing one or more buttons or configuring key fob 120 to place the order upon communicating with merchant device 130) without the need for action by customer 160 to facilitate a quick purchase, as if the people working in the store personally know customer 160's order.

Process 500 includes key fob 120 receiving data from customer device 110 and/or merchant device 130 related to a customer transaction or potential transaction (step 510). In some aspects, the data may be related to a transaction or potential transaction with a merchant associated with merchant device 130. In some embodiments, customer 160 may interact with customer device 110 as a means for providing customer data to key fob 120. For example, customer device 110 may receive input through an I/O device (e.g., touch screen, keypad, etc.) and store the input as data associated with the fast in-store purchase. For example, customer may identify preferences for an order to be assigned to a button on the key fob 120, or multiple orders to be assigned to specific buttons on the key fob 120. Customer device 110 may then communicate with key fob 120, for example, through network 150, wherein key fob 120 receives and stores the customer data, for example, in data storage component 420 (step 520).

In some embodiments, customer preference data is included in the received customer data. In various embodiments, customer preference data may include categories of merchants, for example, coffee shops. In other embodiments, customer preference data may include numerous merchants, or may include one specific merchant. For example, the customer preference data may include data pertaining to a single merchant. In various embodiments, the customer preference data includes an applicable order that customer 160 wishes to place for each merchant and/or an order that customer 160 wishes to place with a category of merchants in general. For example, customer 160 may wish to order a specific drink every time customer 160 visits a specific local coffee shop. Alternatively, the customer preference data may also include more generic orders that are associated with categories of merchants. For example, customer 160 may include an instruction in the preference data to order a cheeseburger from one of a group of merchants that generally sell cheeseburgers.

After steps 510 and 520 have been completed as necessary, customer 160 may carry key fob 120 while approaching a merchant's premises wishing to make a purchase for goods and/or services. Key fob 120 may identify a merchant at the location of customer 160 (step 530). In some embodiments, key fob 120 may identify a merchant through the use of known geo-fencing processes. The geo-fencing process may include determining whether key fob 120 is located within a predetermined location boundary near the identified merchant. In order to determine if key fob 120 is within the predetermined boundary, key fob 120 may determine its own location, which may be determined via GPS or other location-based measurements included in key fob 120. In some aspects, key fob 120 may send the location information, such as latitude-longitude coordinates, to financial service provider device 140. In response, financial service provider device 140 may process the received information to determine if key fob 120 is within a particular predetermined boundary associated with previously identified merchants with which customer 160 would want to initiate automatic transactions. In some embodiments, key fob 120 may communicate with merchant device 130 (e.g., through Bluetooth modules in the respective devices) to identify the merchant that customer 160 is approaching. Merchant device 130 may send information relating to the merchant's identity and/or menu of goods and/or services that are available to order. Key fob 120 may compare this information with the preference data to determine an applicable order (step 540). For example, the customer preference data may include a specific order (e.g., a large coffee) to place with a specific merchant (e.g., a particular coffee shop).

After steps 510-540 have been completed as necessary, key fob 120 may transmit a notification to merchant device 130 (step 550). In some aspects, the transmitted notification may include the determined customer order, thereby placing the order with merchant device 130. In some aspects, key fob 120 may transmit a notification, for example through network 150, to financial service provider device 140, the notification including instructions to purchase the order.

In various embodiments, customer 160 may select options included in the customer preference data instructing key fob 120 to always perform steps 530-550 upon approaching or entering a merchant's premises. In other embodiments, customer 160 may select a first merchant to always perform steps 530-550, and not a second merchant. Alternatively, customer 160 may configure key fob 120 so that it places orders only within a specific time of day. For example, if customer 160 walks to a coffee shop, key fob 120 may place an order for coffee only during hours that are specified by customer 160. Accordingly, customer 160 can walk by these same stores later in the day knowing that an order will not be placed.

In various embodiments, step 550 is triggered by customer 160 pressing a button on key fob 120. Customer 160 may configure key fob 120 to only place orders upon pressing a button on key fob 120, so that customer 160 may choose to set alternative methods of placing orders. In one method, orders are placed by customer 160 pressing one or more buttons on key fob 120. Alternatively, customer 160 may choose to have key fob 120 place orders without customer 160 needing to press one or more buttons on key fob 120. In various embodiments, customer 160 may configure key fob 120 to place a certain number of orders per time. For example, if customer 160 routinely passes a coffee shop daily, customer 160 may configure key fob 120 to place only one order per day. In other embodiments, key fob 120 is only operational in close proximity to merchant device 130 to avoid inadvertent order placement.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, computer-readable media, or existing communications software.

Moreover, while illustrative embodiments have been described herein, the scope includes any and all embodiments having equivalent elements, modifications, omissions, combinations (e.g., of aspects across embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

What is claimed:

1. A fob device for providing in-store purchases, comprising:
   a button;
   a repeater configured for wireless data transmission;
   means for location-based measurement;
   a memory device storing software instructions; and
   one or more processors communicatively coupled to the button and configured to execute the software instructions to:

receive, from a customer device, customer data comprising customer preference data;
store the customer data within the memory device;
determine a proximity between the fob and a merchant device through a geo-fencing process employing the means for location-based measurement, the merchant device being associated with a merchant;
determine whether the fob is located within a location boundary associated with the merchant based on the proximity;
in response to determining the fob is located within the location boundary, determine a customer order for the merchant based on the customer preference data; and
upon detecting a press of the button, transmit the customer order to the merchant device via the repeater.

2. The fob device of claim 1, wherein the fob further comprises a second button communicatively coupled to the one or more processors.

3. The fob device of claim 2, wherein the one or more processors are further configured to execute the software instructions to:
determine a second customer order for the merchant based on the customer preference data;
associate the second customer order with the second button on the fob; and
upon detecting a press of the second button, transmit the second customer order to the merchant device via the repeater.

4. The fob device of claim 3, wherein the one or more processors are further configured to execute the software instructions to:
upon detecting a press of the second button, transmit the second customer order to the merchant device via the repeater.

5. The fob device of claim 2, wherein the one or more processors are further configured to execute the software instructions to:
determine a second customer order for a second merchant based on the customer preference data, the second merchant being different from the merchant; and
upon detecting a press of the second button on the fob, transmit the second customer order to a second merchant device associated with the second merchant.

6. The fob device of claim 1, wherein the customer preference data identifies categories of merchants or a specific merchant.

7. The fob device of claim 1, wherein the fob further includes a Bluetooth or Near Field Communication module, and wherein the fob identifies the merchant by communicating through the Bluetooth or Near Field Communication module with the merchant device.

8. The fob device of claim 1, wherein the customer device is a smart phone.

9. The fob device of claim 1, wherein the one or more processors are further configured to execute the software instructions to:
transmit a notification to a financial service provider device, the notification including instructions to purchase the order.

10. The fob device of claim 1, wherein:
the fob further comprises a communication component comprising at least one of a Bluetooth device, a near field communication antenna, or a radiofrequency identification device; and
transmitting the customer order to the merchant device via the repeater comprises:
transmitting, to the customer device and via a communication component, instructions to generate a purchase token;
receiving, from the customer device, the purchase token; and
communicating, to the merchant device, the purchase token via the repeater.

11. A method for providing in-store purchases, comprising:
receiving, at a fob and from a customer device, customer preference data;
storing the customer preference data in a memory device within the fob;
determining a proximity between the fob and a merchant device through a geo-fencing process employing means for location-based measurement within the fob, the merchant device being associated with a merchant;
determining whether the fob is located within a location boundary associated with the merchant based on the proximity;
in response to determining the fob is located within the location boundary, determining a customer order for the merchant based on the customer preference data; and
upon detecting a press of a button on the fob, transmitting the customer order to the merchant device via a repeater within the fob.

12. The method of claim 11, further comprising:
determining a second customer order for the merchant based on the customer preference data;
associating the second customer order with a second button on the fob; and
upon detecting a press of the second button, transmitting the second customer order to the merchant device via the repeater.

13. The method of claim 12, further comprising:
upon detecting a press of the second button, transmitting the second customer order to the merchant device.

14. The method of claim 12, further comprising:
determining a second customer order for a second merchant based on the customer preference data; and
upon detecting a press of the second button, transmitting the second customer order to a second merchant device.

15. The method of claim 11, wherein the customer preference data identifies categories of merchants or a specific merchant.

16. The method of claim 11, wherein the customer preference data includes an order to purchase a good or service from the merchant.

17. The method of claim 11, wherein the fob further includes a Bluetooth or Near Field Communication module, and wherein the fob identifies the merchant by communicating through the Bluetooth or Near Field Communication module with the merchant device.

18. The method of claim 11, wherein transmitting the customer order comprises:
transmitting, to the customer device, instructions to generate a purchase token via a communication component on the fob;
receiving, from the customer device, the purchase token; and
transmitting the purchase token to the merchant device via the repeater.

19. The method of claim 11, wherein the customer device is a smart phone.

20. The method of claim 11, further comprising:
transmitting a notification to a financial service provider device, the notification including instructions to purchase the order.

* * * * *